July 27, 1926.
T. D. DAVIS
ANTISKIDDING DEVICE
Filed Dec. 22, 1925
1,593,694
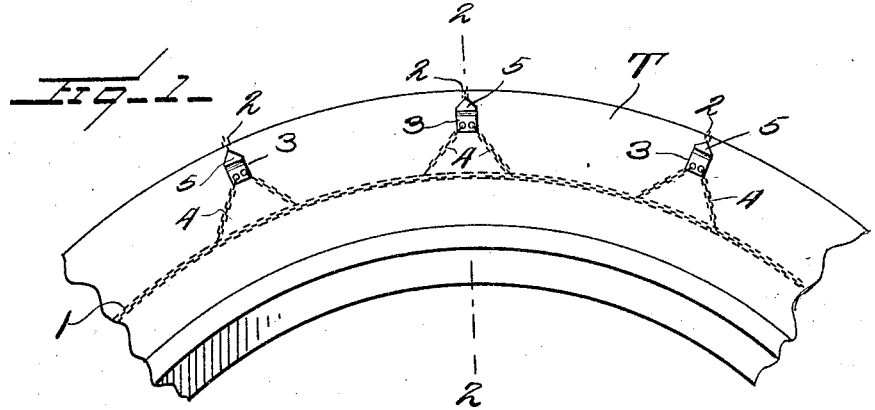
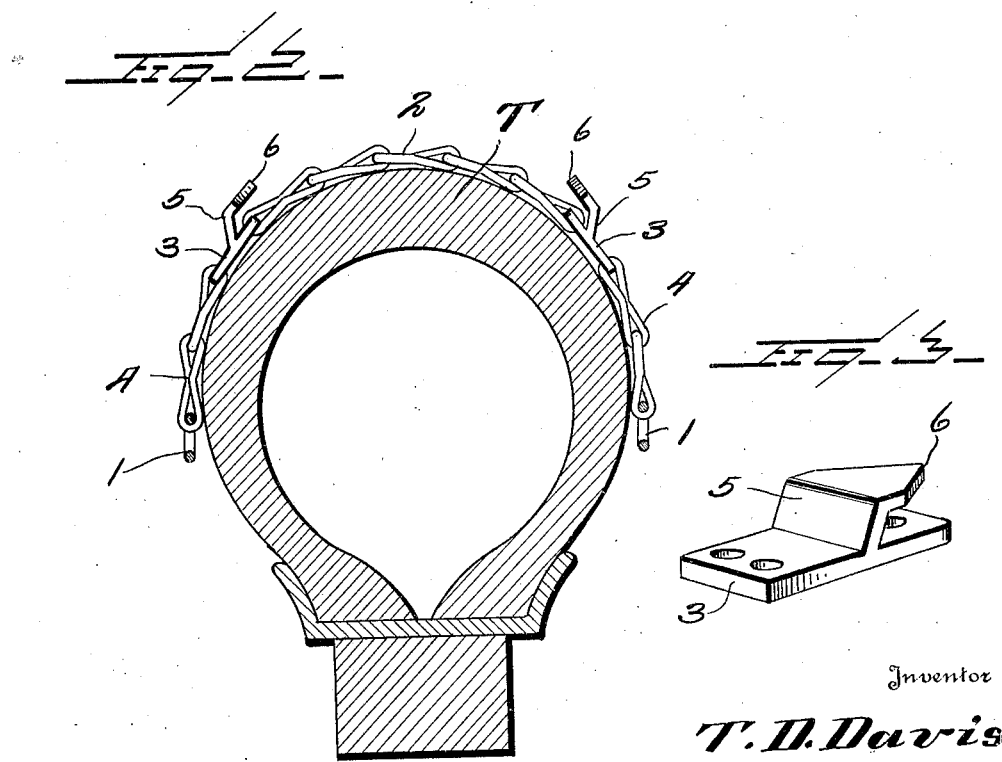
Inventor
T. D. Davis
By Wilfred E. Lawson
Attorney Patented July 27, 1926.

1,593,694

UNITED STATES PATENT OFFICE.

THOMAS D. DAVIS, OF GIRARDVILLE, PENNSYLVANIA, ASSIGNOR OF ONE-HALF TO ADAM W. HARTWIG, JR., OF TAMAQUA, PENNSYLVANIA.

ANTISKIDDING DEVICE.

Application filed December 22, 1925. Serial No. 77,062.

This invention relates to certain improvements in anti-skidding devices and it is an object of the invention to provide a structure of this kind comprising means normally free of the road surface but which, upon tendency to skid, has contact with such surface in a manner to effectively resist such movement.

Another object of the invention is to provide a device of this kind wherein road engaging members are arranged at opposite sides of the tire and normally out of contact with the road surface, each of said members comprising a plate and an outstanding lug, said lug having direct contact with the road surface to prevent skidding movement.

The invention consists in the details of construction and in the combination and arrangement of the several parts of my improved anti-skidding device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view in elevation of a wheel showing applied thereto an anti-skidding device constructed in accordance with an embodiment of my invention;

Figure 2 is an enlarged sectional view taken substantially on the line 2—2 of Figure 1;

Figure 3 is a view in perspective of one of my improved lugs unapplied.

As disclosed in the accompanying drawing, my improved anti-skidding device in its entirety comprises the side chains or members 1 adapted to be disposed, in a well known manner, at opposite sides of a tire T together with the tread chains 2. The extremities of each of the tread chains 2 are suitably attached to the end portion of a plate 3 while the opposite ends of said plate 3 have secured thereto at transversely spaced points the extremities of the bracing chains 4, said chains 4 diverging in a direction away from the plate 3 and suitably connected with the adjacent side member or chain 1. The outer face of each of the plates 3 is provided with a road engaging lug 5 the outer or free end portion of which being spaced from the plate 1 and extending a desired distance beyond the adjacent end thereof. The free end portion of this lug 5 is pointed, as at 6, to assure the most effective contact with the road surface.

In practice, when my improved device in its entirety is in applied position, the plates 3 are so positioned as to have the pointed ends 6 of the lugs 5 terminate a slight distance inwardly of the tread of the tire T. In practice, these pointed extremities 6 are preferably one-half inch inwardly of the tread of the tire but I do not wish to be understood as limiting myself to this exact arrangement.

When the wheel to which the tire T is applied has a tendency to skid, the resultant lateral or transverse bending movement of the tire will cause the pointed end portions 6 of the lugs 5 to have substantially instantaneous contact with the road surface whereby such skidding movement is effectually prevented.

From the foregoing description it is thought to be obvious that an anti-skidding device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In a non-skidding device, the combination with side members, and transversely disposed tread members; of plates secured to the extremities of the tread members and operatively attached to the side members, and a lug carried by each of the plates, said lug having its free portion offset with respect to the plate and extending therefrom, each of said plates and the lug carried thereby, when the device is applied to a tire, being normally inwardly of the tread of the tire, the free end portion of the lug being disposed toward the adjacent tread member.

2. In a non-skidding device, the combination with side members, and transversely disposed tread members; of plates secured to the extremities of the tread members and operatively attached to the side members, and a lug carried by each of the plates, said lug having its free portion offset with respect to the plate and extending therefrom, each of said plates and the lug carried thereby, when the device is applied to a tire, being normally inwardly of the tread of the tire, the free end portion of the lug being disposed toward the adjacent tread member and extending outwardly beyond the adjacent end of the plate.

In testimony whereof I affix my signature.

THOMAS D. DAVIS.